United States Patent
Lee et al.

(10) Patent No.: US 9,348,859 B2
(45) Date of Patent: May 24, 2016

(54) PROVIDING RECORD-LEVEL SHARING (RLS) TO LOCAL DATA SETS

(71) Applicant: International Business Machines Corporation, Armonk, NY (US)

(72) Inventors: Jason C. Lee, Union City, CA (US); Terri A. Mendendez, Richmond, MA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 13/850,233

(22) Filed: Mar. 25, 2013

(65) Prior Publication Data
US 2014/0289209 A1    Sep. 25, 2014

(51) Int. Cl.
*G06F 7/00* (2006.01)
*G06F 17/30* (2006.01)

(52) U.S. Cl.
CPC .... *G06F 17/30362* (2013.01); *G06F 17/30238* (2013.01)

(58) Field of Classification Search
CPC ............... G06F 17/30362; G06F 17/30238
See application file for complete search history.

(56) References Cited

U.S. PATENT DOCUMENTS

| | | | |
|---|---|---|---|
| 4,399,504 A | 8/1983 | Obermarck et al. | |
| 5,146,561 A * | 9/1992 | Carey .................... | H04L 29/00 707/999.01 |
| 5,355,477 A | 10/1994 | Strickland et al. | |
| 5,745,748 A | 4/1998 | Ahmad et al. | |
| 6,253,236 B1 * | 6/2001 | Troxel et al. .................. | 709/217 |
| 6,496,865 B1 | 12/2002 | Sumsion et al. | |
| 6,598,131 B2 | 7/2003 | Kedem et al. | |
| 6,678,700 B1 | 1/2004 | Moore et al. | |
| 7,165,096 B2 | 1/2007 | Soltis | |
| 7,401,196 B2 | 7/2008 | Mori et al. | |
| 8,001,242 B2 | 8/2011 | Mild et al. | |
| 2004/0220934 A1 * | 11/2004 | Dearing et al. .................... | 707/9 |
| 2005/0289188 A1 * | 12/2005 | Nettleton et al. ............. | 707/200 |
| 2010/0057741 A1 | 3/2010 | Fincher et al. | |
| 2010/0299384 A1 | 11/2010 | Purpura | |
| 2011/0179285 A1 * | 7/2011 | Shasha et al. .................. | 713/189 |

* cited by examiner

*Primary Examiner* — Usmaan Saeed
*Assistant Examiner* — Paul Kim
(74) *Attorney, Agent, or Firm* — Zilka-Kotab, PC

(57) ABSTRACT

Systems, methods, and computer program products are described for providing record-level sharing (RLS) for data sets to local users of a system. In one embodiment, a process includes requesting access to a data set from a record-oriented file system in which the file system manages records on behalf of one or more users, and the access is requested for a first local user. The process proceeds by locking the data set in the file system such that no direct access of the data set is allowed. Read and/or write requests for the data set are processed using the representation of the data set in the designated server address space. The data set in the file system is updated with any changes made to the representation of the data set in the designated server address space.

18 Claims, 6 Drawing Sheets

PROVIDING RECORD-LEVEL SHARING (RLS) TO LOCAL DATA SETS

BACKGROUND

The present invention relates to data center management and file systems, and more specifically, this invention relates to locking at the record level of a file structure to ensure data integrity when performing operations to local data set records.

File systems which allow direct and sequential accesses to data stored therein typically utilize a B+ tree structure which is a variation of the basic B tree structure with all terminal nodes thereof containing data records. The non-terminal nodes of the B+ tree structure are referred to as an index structure. The top of the B+ tree structure is a single node referred to as the root. The B+ tree structure is a balanced tree with all the terminal nodes at the same level such that all data records stored therein have the same or substantially the same search length. The effectiveness and the popularity of the B+ tree structure may be attributable to the shape of the tree. The B+ tree tends to be short and wide, referred to typically as "flat," e.g., it has few hierarchical levels and many nodes at each level.

The B+ tree structure has become somewhat of a standard for organization of files. Many database systems (relational or otherwise) and general-purpose access methods, such as virtual storage access method (VSAM), are designed using the B+ tree structure. The VSAM includes some additional features over other typical access methods, such as key compression. For ease of discussion, and due to the fact that VSAM was one of the first commercial products in the world that used the B+ tree structure, VSAM terminology may be used in the descriptions provided, but the descriptions are not limited to VSAM alone, as any access method may be used in relation to a B+ tree structure.

Virtual storage access method (VSAM) is a disk file storage access method used in IBM z/OS environments. VSAM data sets include multiple records, and the data sets are of fixed or variable length, and are organized into fixed-size blocks called Control Intervals (CIs). The CIs are then organized into larger groups referred to as Control Areas (CAs). CIs are used as units of transfer between direct access storage devices (DASDs) and requesting systems such that a read request will read one complete CI. CAs are used as units of allocation, such that when a VSAM data set is defined, an integral number of CAs will be allocated for that VSAM data set.

When multiple users of a VSAM file system attempt to access data sets on the same z/OS system, read/write integrity may be lost due to the multiple users possibly making different changes, deletions, and/or additions to one or more data sets on the z/OS system, which may cause the z/OS system to lose data integrity. Accordingly, generally, z/OS systems typically do not allow multiple users to access the same data sets simultaneously by using a lock mechanism which allows only one user to access a data set at a time. This lock can result in latency to the system when multiple users are attempting to access one or more of the same data sets.

Some attempted solutions have been proposed to alleviate this problem. One such attempt, as presented in U.S. Patent Appl. Pub. No. 2010/0299384, allows multiple users to access a VSAM data set by sending any read/write requests directed toward that data set to a single user which has directly opened the data set. Then, these read/write requests have to be serialized on the user's system, and processed accordingly, since the data set is locked for use by the user's system and unavailable to other users. One drawback to this solution is that if the user's system fails, which is accessing the data set directly, all access to the data set is lost for all users. This is because this solution establishes a single point of failure (SPOF), which is capable of adversely impacting availability when the single user's system fails or is otherwise lost. Another drawback to this solution is that there is performance overhead associated with sending the read/write requests to the single user, which results in latency in the z/OS system.

According to another attempt to address the problem, as presented in U.S. Pat. No. 5,355,477, U.S. Pat. No. 4,399,504, and U.S. Patent Appl. Pub. No. 2004/0220934, multiple users are allowed to directly access the VSAM data set from the same z/OS system with full read/write integrity while executing in "sysplex" mode. Some of the drawbacks to this solution include the financial cost of purchasing sysplex hardware, e.g., a Coupling Facility (CF), and that performance overhead is associated with interfacing with the sysplex hardware, which results in latency in the z/OS system.

SUMMARY

In one embodiment, a system includes logic adapted to request access to a data set from a record-oriented file system, wherein the file system manages records on behalf of one or more users, and wherein the access is requested for a first local user, logic adapted to lock the data set in the file system such that no direct access of the data set is allowed, logic adapted to process read and/or write requests for the data set using the representation of the data set in the designated server address space, and logic adapted to update the data set in the file system with any changes made to the representation of the data set in the designated server address space.

In another embodiment, a computer program product for providing record-level sharing (RLS) to a data set includes a computer readable storage medium having program code embodied therewith, the program code readable/executable by a processor to request, using the processor, access to a data set from a record-oriented file system, wherein the file system manages records on behalf of one or more users, and wherein the access is requested for a first local user, lock the data set in the file system such that no direct access of the data set is allowed, process, using the processor, read and/or write requests for the data set using the representation of the data set in the designated server address space, and update the data set in the file system with any changes made to the representation of the data set in the designated server address space.

In yet another embodiment, a method for providing RLS to a data set includes requesting access to a data set from a record-oriented file system, wherein the file system manages records on behalf of one or more users, and wherein the access is requested for a first local user, locking the data set in the file system such that no direct access of the data set is allowed, processing read and/or write requests for the data set using the representation of the data set in the designated server address space, and updating the data set in the file system with any changes made to the representation of the data set in the designated server address space.

Other aspects and embodiments of the present invention will become apparent from the following detailed description, which, when taken in conjunction with the drawings, illustrate by way of example the principles of the invention.

DETAILED DESCRIPTION

Figure 1:
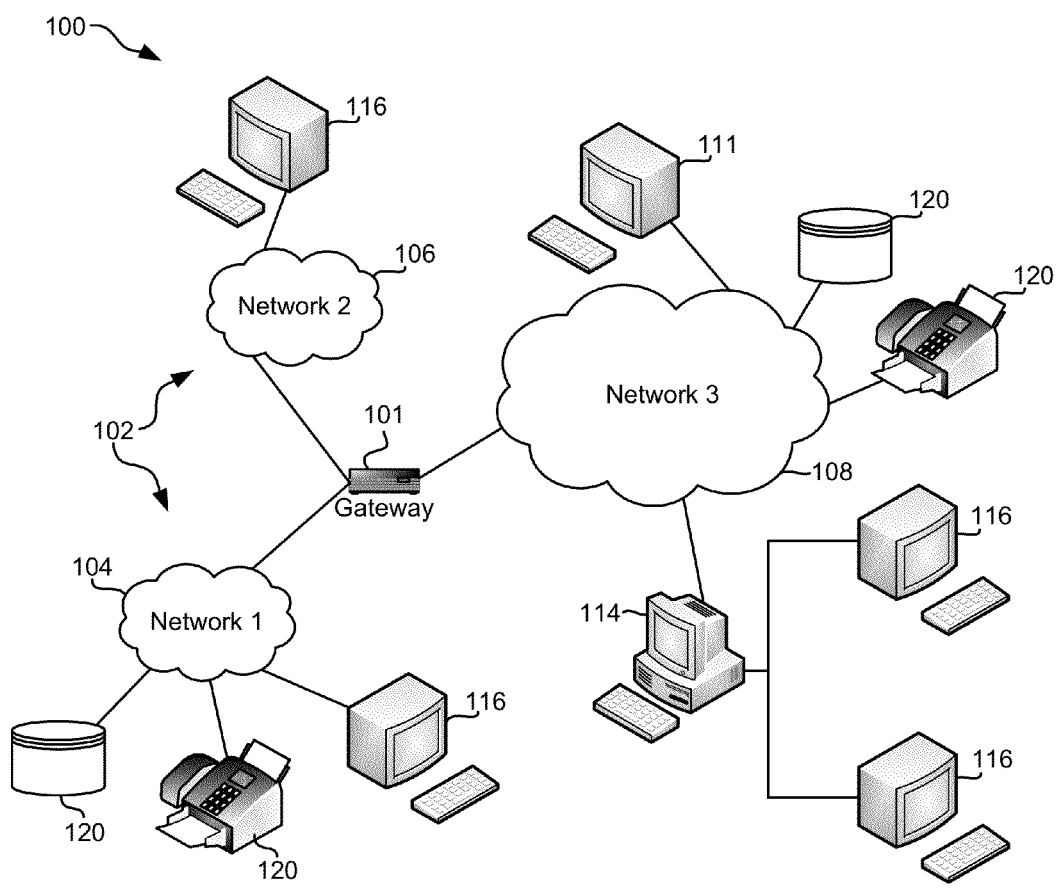
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

At a high level, record-level sharing (RLS) is provided to a data set in a record-oriented file system, such as a file system utilizing virtual storage access method (VSAM) in IBM z/OS environments, with full read/write integrity when the data set is stored locally to the same z/OS system and the system is executing in local mode. In addition, multiple local users may be allowed to access the VSAM data set with full read/write integrity without the cost of a coupling facility (CF) and without a single point of failure (SPOF) at a user level, as are required in some conventional methods.

In one general embodiment, a system includes logic adapted to request access to a data set from a record-oriented file system, wherein the file system manages records on behalf of one or more users, and wherein the access is requested for a first local user, logic adapted to lock the data set in the file system such that no direct access of the data set is allowed, logic adapted to process read and/or write requests for the data set using the representation of the data set in the designated server address space, and logic adapted to update the data set in the file system with any changes made to the representation of the data set in the designated server address space.

In another general embodiment, a computer program product for providing RLS to a data set includes a computer readable storage medium having program code embodied therewith, the program code readable/executable by a processor to request, using the processor, access to a data set from a record-oriented file system, wherein the file system manages records on behalf of one or more users, and wherein the access is requested for a first local user, lock the data set in the file system such that no direct access of the data set is allowed, process, using the processor, read and/or write requests for the data set using the representation of the data set in the designated server address space, and update the data set in the file system with any changes made to the representation of the data set in the designated server address space.

In yet another general embodiment, a method for providing RLS to a data set includes requesting access to a data set from a record-oriented file system, wherein the file system manages records on behalf of one or more users, and wherein the access is requested for a first local user, locking the data set in the file system such that no direct access of the data set is allowed, processing read and/or write requests for the data set using the representation of the data set in the designated server address space, and updating the data set in the file system with any changes made to the representation of the data set in the designated server address space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
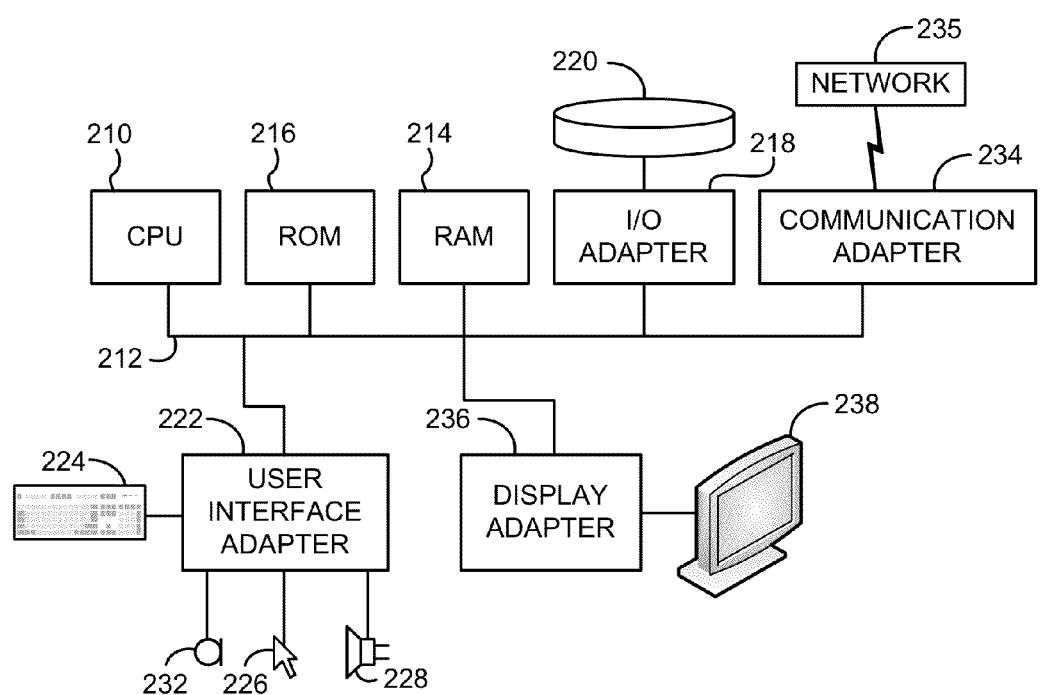
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
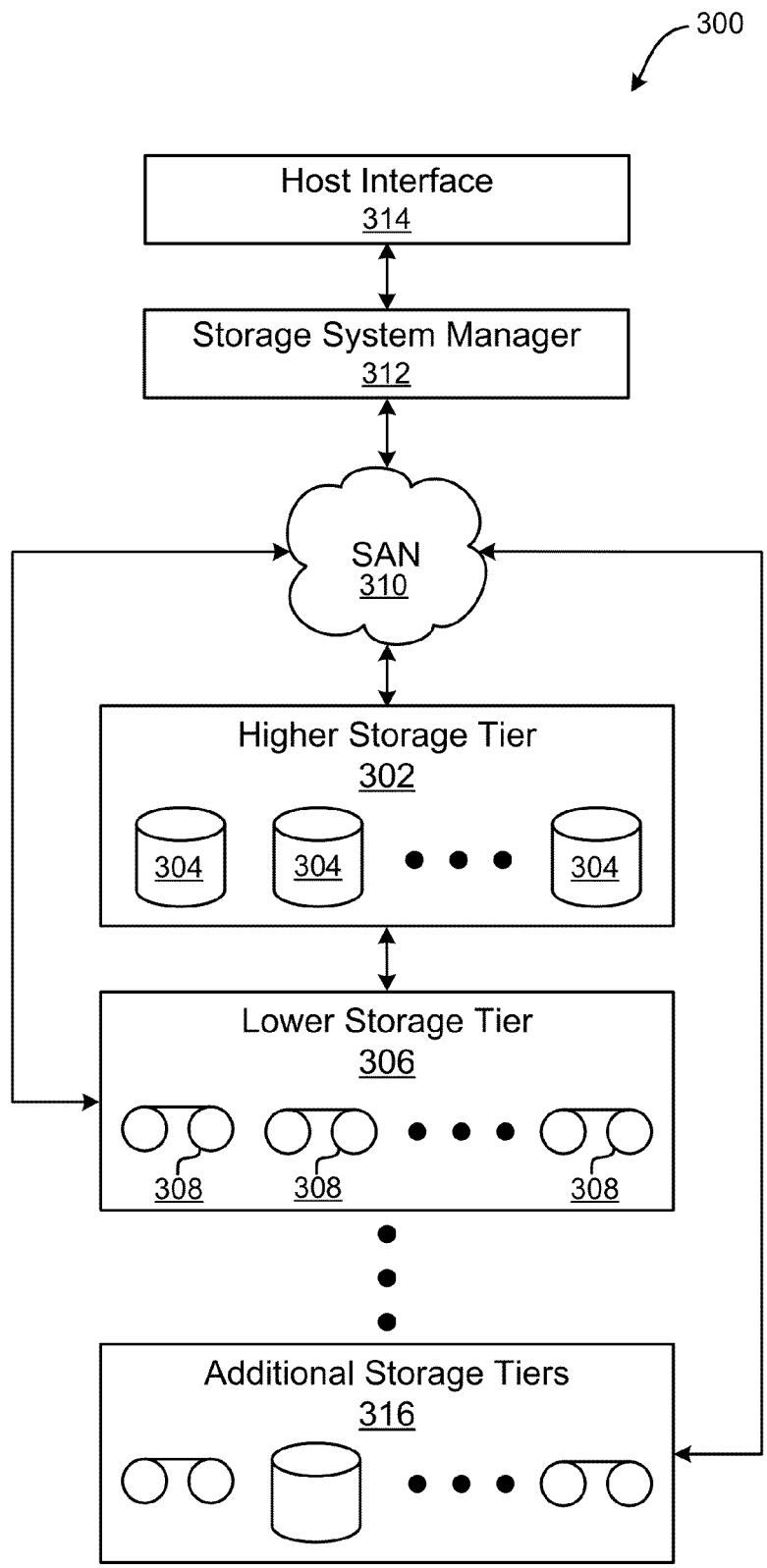
FIG. 3 is a simplified block diagram of a data storage system, according to one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/ or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

For ease of discussion, and due to the fact that VSAM was one of the first commercial products in the world that used the B+ tree structure, VSAM terminology may be used in the descriptions provided herein. However, the embodiments described herein are not limited to a system which uses VSAM, as any record-oriented file system, such as a key sequenced data set (KSDS), entry sequenced data set (ESDS), relative record data set (RRDS), variable-length RRDS (VR-RDS), etc., may be used with any of the embodiments described herein. The file system may or may not utilize a nonlinear data set structure.

According to one embodiment, multiple local users may be allowed to access the same file or data set in the file system, such as a file system utilizing VSAM in an IBM z/OS environment, with full read/write integrity, record-level locking, and 64 bit buffering from the same z/OS system without the need for a CF or a SPOF.

Figure 4:
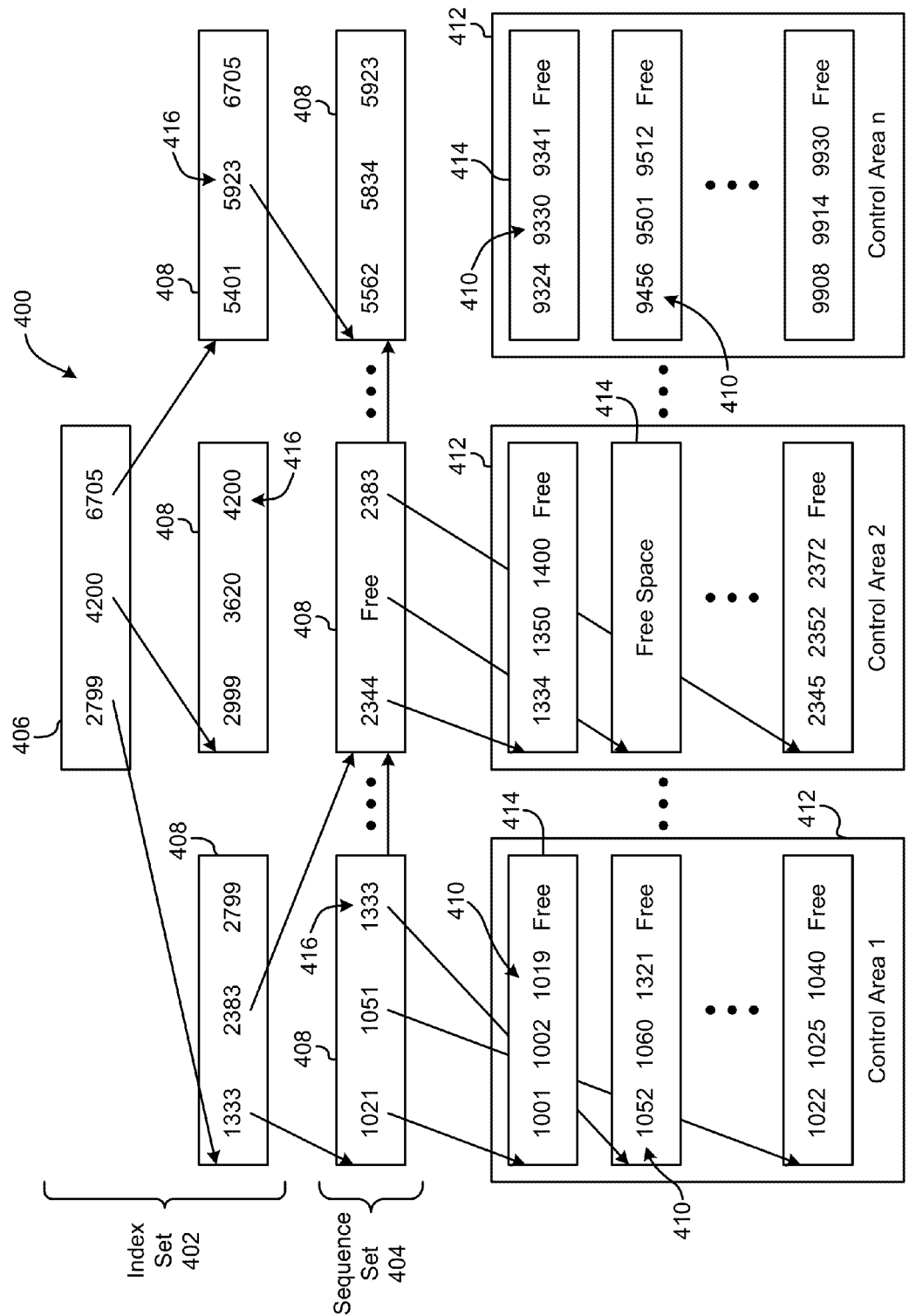
FIG. 4 illustrates a file structure in accordance with one embodiment.

A file structure of a data set 400 is shown in FIG. 4 which includes two parts, the 'sequence set' 404 and the 'index set' 402. The index set 402 includes the root 406, along with a plurality of index nodes 408. The terminal nodes of the file structure of the data set 400 are keyed data records 410 which are organized into one or more data control intervals (CIs) 414. Above the data CIs 414 are one or more data control areas (CAs) 412, with each data CA 412 being capable of organizing a plurality of data CIs 414. Each node 408 in the index set 402 is an index CI, which includes one or more index records 416.

In the file structure of the exemplary data set 400 shown in FIG. 4, each data CA 412 includes three data CIs 414, but any number may be included according to storage and search requirements of a particular user of the file system. In addition, as shown in FIG. 4, each data CIs 414 includes three data records 410, but any number may be included according to storage and search requirements of a particular user of the file system.

Figure 5:
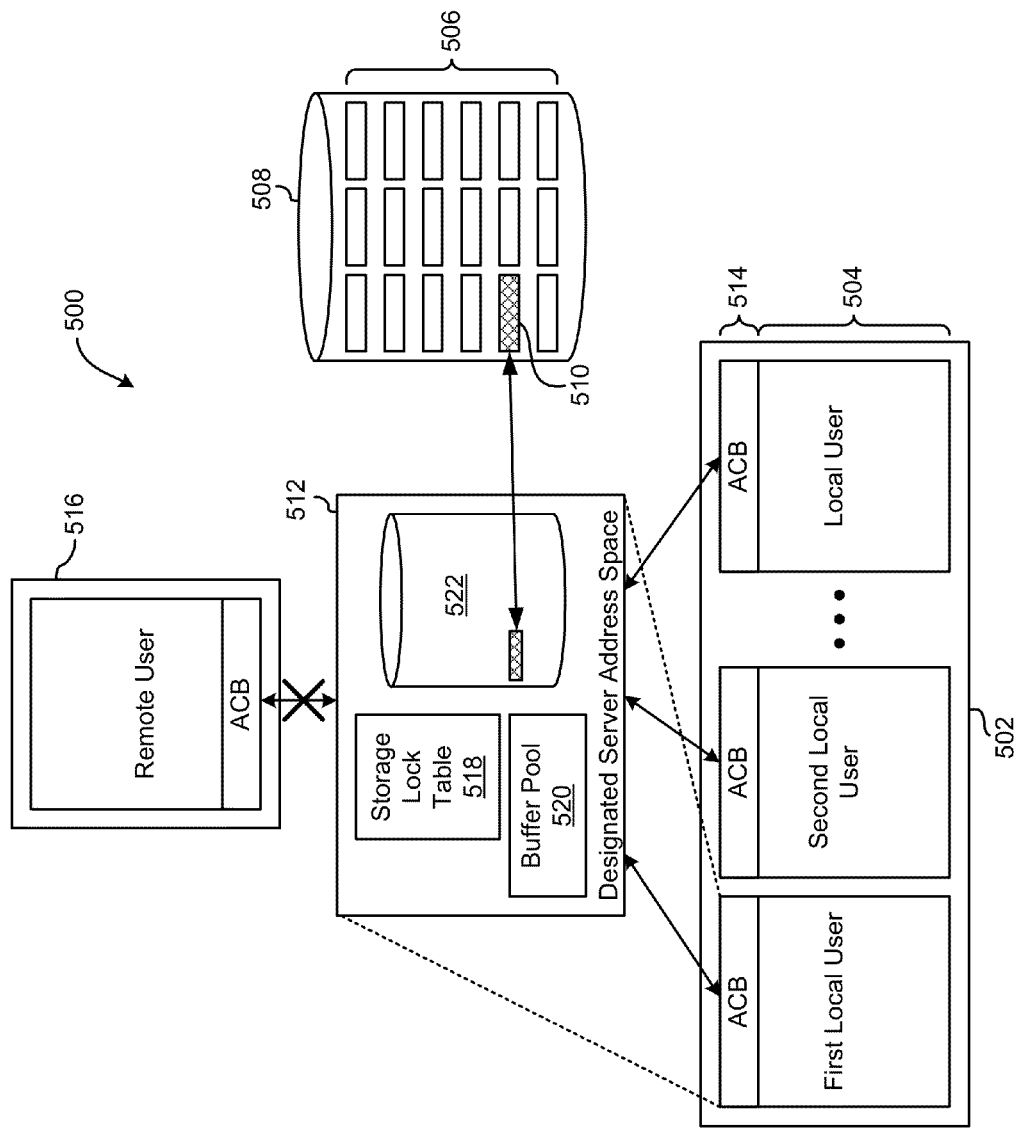
FIG. 5 shows a simplified diagram of a system capable of allowing multiple users access to a single data set in accordance with one embodiment.

Now referring to FIG. 5, a system 500 is shown having a first system 502, one or more second systems 516, and one or more data sets 506 stored in an IBM z/OS file system 508. In order to provide record-level sharing (RLS) of the same data set 510 in a single z/OS system 508 for local users 504 of a system 502, an option may be presented to a local user 504 when opening a VSAM data set to share the data set 510 with other local users, such as any local users on the first system 502. The option may be presented via an existing access control block (ACB) interface 514, in one embodiment. However, other remote users on other systems 516 still are denied access to the data set 510.

When a first local user selects affirmatively to provide the representation of the data set 510 in the designated server address space 512 such that other local users 504 may share it, the designated server address space 512 is created and a representation of the data set 510 is created therein. The designated server address space 512 may be hosted by the first system 502 which opened the data set 510, such that other local users 504 are capable of accessing the designated server address space 512. When other subsequent local users 504 access the representation of the data set 510 in the designated server address space 512, the originally created ACB 514 may be reused in all subsequent access to the representation of the data set 510.

Accordingly, the designated server address space 512 may be hosted by a server, a personal computer, a controller, a processor within a more complex computing system or any other system or apparatus capable of hosting the designated server address space 512. The designated server address space 512, according to one embodiment, may include a set of control structures 522, that are built upon creating the designated server address space 512, to represent the data set 510 being opened.

In one embodiment, the one or more second local users 504 may utilize one or more second ACBs 514 to access the representation of the data set 510 from this host system 502.

Attempts to open the data set 510 directly from other systems, such as the one or more second systems 516, are failed in order to maintain data integrity. The designated server address space 512 provides all necessary record-level locking, such as via an in storage lock table 518 in one approach. Record keys may be provided for the one or more data sets 506, and the record keys may hash into the table 518. In this way, any data sets 506 which are opened in the designated server address space 512 may be locked so that no other second systems 516 are capable of directly opening the locked data sets.

In one embodiment, the entries in the table 518 may be used to chain requests together to sequentially process the requests when true contention (request for same record in the data set 510) and/or false contention (different records in the data set 510 which hash to same location) occurs. The designated server address space 512 may also provide a shared buffer pool 520 with which to temporarily store any records which are currently being requested (and accessed by the first system), any requests for operations on the records, and/or any other suitable information, data, operations, etc. The shared buffer pool 520 may be of any size, such as 16 bit, 32 bit, 64 bit, 128 bit, 256 bit, etc. Also, the shared control structure 522 may include buffer-related information organized into a tree-like structure for quick searching of data in the buffer pool 520.

Figure 6:
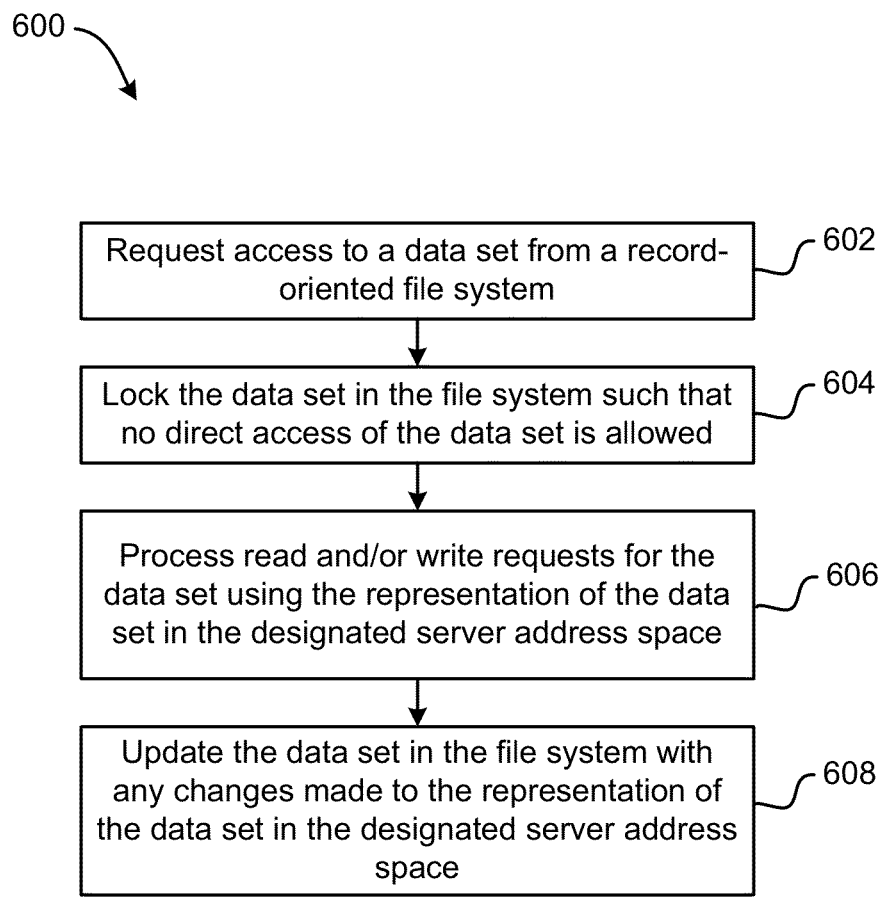
FIG. 6 is a flowchart of a method, according to one embodiment.

Now referring to FIG. 6, a flowchart of a method 600 for providing RLS to a data set is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a mainframe in an IBM z/OS environment, in one approach, by a data storage system, a file system controller, a tiered data storage system controller, a processor (such as a CPU, an ASIC, an FPGA, etc.), a server, etc., or any other suitable device or component of a data storage system.

Optional operations described below are those operations which may be omitted, may be performed once while other operations are performed multiple times or vice versa, may be performed by other entities or systems and relied upon by other operations, etc., according to various embodiments.

As shown in FIG. 6, method 600 may initiate with operation 602, where access to a data set is requested from a record-oriented file system, the file system managing records on behalf of one or more users, and with the access being requested for a first local user. In one embodiment, the file system may be a VSAM system that stores a plurality of VSAM data sets, each data set comprising one or more records therein. The records may be managed for local and/or remote users, and usually all users will be remote to the file system. However, for the sake of this description, a local user is a user which is local to the system which is providing the designated server address space.

The record-oriented file system may utilize any organizational structure which provides for a nonlinear data set, such as VSAM, KSDS, ESDS, RRDS, VRRDS, etc.

In operation 604, the data set is locked in the file system such that no direct access of the data set is allowed. Any type of locking mechanism known in the art may be used.

In operation 606, read and/or write requests for the data set are processed using the representation of the data set in the designated server address space. In this way, any changes, deletions, and/or additions to the data set are reflected in the representation of the data set, which appears just like the data set would on the file system.

In one approach, read and/or write requests for the data set by the first local user and one or more second local users are processed sequentially in order of receipt thereof regardless of which local user issued the read and/or write request when it is indicated that sharing of the data set is allowed. Furthermore, remote users are still barred from accessing the representation of the data set in the designated server address space. These second local users may utilize their own ACB to access the representation of the data set, as would be understood by one of skill in the art.

In operation 608, the data set in the file system is updated with any changes made to the representation of the data set in the designated server address space. In this way, the data set is updated to reflect all changes that were indicated for the data set, but which were performed only on the representation thereof. After the update of the data set, the local users will no longer have access to the data set, unless another request is issued to have such access.

In one embodiment, the lock on the data set may be relinquished after completing the update, so that another user may access the data set directly on the file system, or in a server address space provided thereto.

In a further approach, it may be determined whether sharing is allowed for the data set prior to allowing the one or more second local users to access the representation of the data set.

In one approach, determining whether sharing is allowed for the data set may include outputting an option to the first local user to determine whether sharing is allowed for the data set, and receiving an indication of a level of sharing, which may be indicated by the user or automatically set according to a default action, a set of criteria, etc. The criteria may include any suitable factors, such as which systems are allowed access to the data set normally, the type of data set, contents of the data set, an amount of available processing to handle multiple requests, etc.

In this approach, read and/or write requests for the data set by the first local user and one or more second local users may be processed sequentially in order of receipt thereof regardless of which local user issued the read and/or write request when it is indicated that sharing of the data set is allowed.

According to one embodiment, the designated server address space may include a set of control structures which simulate interactions with the file system, an in storage lock table adapted to store locking information for each record in the data set, and/or a shared buffer pool adapted to temporarily store any records which are currently being accessed.

In a further embodiment, the entries in the table may be used to chain the read and/or write requests together to sequentially process the read and/or write requests when true contention and/or false contention occurs, as explained in more detail herein.

In more approaches, a computer program product and a system may be provided which perform some or all of the functionality of method 600. For example, a system may comprise a processor (such as a CPU, FPGA, ASIC, etc.) and logic integrated with and/or executable by the processor (the logic possibly being hardware, software, or a combination thereof), the logic being adapted to: request, using the processor, access to a data set from a record-oriented file system, wherein the file system manages records on behalf of one or more users, and wherein the access is requested for a first local user; lock the data set in the file system such that no direct access of the data set is allowed; process read and/or write requests for the data set using the representation of the data set in the designated server address space; and update the data set in the file system with any changes made to the representation of the data set in the designated server address space.

In another approach, a computer program product for providing RLS may comprise a computer readable storage medium having program code embodied therewith. The program code is readable/executable by a processor to: request, using the processor, access to a data set from a record-oriented file system, wherein the file system manages records on behalf of one or more users, and wherein the access is requested for a first local user; lock the data set in the file system such that no direct access of the data set is allowed; process, using the processor, read and/or write requests for the data set using the representation of the data set in the designated server address space; and update the data set in the file system with any changes made to the representation of the data set in the designated server address space.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a processor and logic integrated with and/or executable by the processor, the logic configured to:
request access to a data set from a record-oriented file system, wherein the file system manages records on behalf of one or more users, wherein the file system is a virtual storage access method (VSAM) system, and wherein the access is requested for a first local user;
determine whether sharing is allowed and a level of sharing for the data set by:
outputting an option to the first local user requesting information about sharing of the data set; and
receiving an indication of the level of sharing for the data set;
lock the data set in the file system such that no direct access of the data set is allowed;
create and host a designated server address space using an access control block (ACB) interface, wherein the designated server address space comprises:
a set of control structures which simulate interactions with the file system;
an in storage lock table configured to store locking information for each record in the data set; and
a shared buffer pool configured to temporarily store any records which are currently being accessed;
create a representation of the data set in the designated server address space;
process read and/or write requests for the data set using the representation of the data set in the designated server address space by processing read and/or write requests for the data set from the first local user and one or more second local users sequentially in order of receipt thereof regardless of which local user issued the read and/or write request when it is indicated that sharing of the data set is allowed;
update the data set in the file system with any changes made to the representation of the data set in the designated server address space; and
relinquish the lock on the data set after completing the update.

2. The system as recited in claim 1, wherein the logic is configured to fail attempts to open the data set directly from other systems to maintain data integrity.

3. The system as recited in claim 1, wherein the logic is configured to hash a record key provided for the data set into the in storage lock table while the data set is opened.

4. The system as recited in claim 1, wherein the set of control structures comprises buffer-related information organized into a tree-like structure providing quick searching of the shared buffer pool.

5. The system as recited in claim 1, wherein the logic is configured to create and host one or more second ACBs configured to provide one or more second users access the representation of the data set.

6. The system as recited in claim 1, wherein the record-oriented file system utilizes an organizational structure that supports nonlinear data sets.

7. The system as recited in claim 1, wherein the logic is further configured to use entries in the in storage lock table to chain the read and/or write requests together to sequentially process the read and/or write requests when true contention and/or false contention occurs.

8. The system as recited in claim 7, wherein a true contention exists in response to a request for a same record in the data set, and wherein a false contention exists in response to a request for different records in the data set which hash to a same location.

9. A computer program product for providing record-level sharing (RLS) to a data set, the computer program product comprising a computer readable storage medium having program code embodied therewith, the program code readable/executable by a processor to:
request, using the processor, access to a data set from a record-oriented file system, wherein the file system manages records on behalf of one or more users, and wherein the access is requested for a first local user;
determine, using the processor, whether sharing is allowed and a level of sharing for the data set by:
outputting an option to the first local user requesting information about sharing of the data set; and
receiving an indication of the level of sharing for the data set;
lock the data set in the file system such that no direct access of the data set is allowed;
create and host, using the processor, a designated server address space using an access control block (ACB) interface, wherein the designated server address space comprises:
a set of control structures which simulate interactions with the file system;
an in storage lock table configured to store locking information for each record in the data set; and
a shared buffer pool configured to temporarily store any records which are currently being accessed;
create, using the processor, a representation of the data set in the designated server address space;
process, using the processor, read and/or write requests for the data set using the representation of the data set in the designated server address space by processing read and/or write requests for the data set from the first local user and one or more second local users sequentially in order of receipt thereof regardless of which local user issued the read and/or write request when it is indicated that sharing of the data set is allowed;
update the data set in the file system with any changes made to the representation of the data set in the designated server address space; and relinquish, using the processor, the lock on the data set after completing the update.

10. The computer program product as recited in claim 9, wherein the program code readable/executable by the processor is configured to fail attempts to open the data set directly from other systems to maintain data integrity.

11. The computer program product as recited in claim 9, wherein the program code readable/executable by the processor is configured to hash a record key provided for the data set into the in storage lock table while the data set is opened.

12. The computer program product as recited in claim 11, wherein the program code readable/executable by the processor is configured to create and host one or more second ACBs configured to provide one or more second users access the representation of the data set.

13. The computer program product as recited in claim 9, wherein the record-oriented file system utilizes an organizational structure that supports nonlinear data sets.

14. The computer program product as recited in claim 9, wherein the set of control structures comprises buffer-related information organized into a tree-like structure providing quick searching of the shared buffer pool.

15. The computer program product as recited in claim 14, wherein the program code readable/executable by the processor is configured to use entries in the in storage lock table to chain the read and/or write requests together to sequentially process the read and/or write requests when true contention and/or false contention occurs, wherein a true contention exists in response to a request for a same record in the data set, and wherein a false contention exists in response to a request for different records in the data set which hash to a same location.

16. A method for providing record-level sharing (RLS) to a data set, the method comprising:
    requesting access to a data set from a record-oriented file system, wherein the file system manages records on behalf of one or more users, wherein the file system is a virtual storage access method (VSAM) system, and wherein the access is requested for a first local user;
    determining whether sharing is allowed and a level of sharing for the data set by:
        outputting an option to the first local user requesting information about sharing of the data set; and
        receiving an indication of the level of sharing for the data set;
    locking the data set in the file system such that no direct access of the data set is allowed;
    creating and hosting a designated server address space using an access control block (ACB) interface, wherein the designated server address space comprises:
        a set of control structures which simulate interactions with the file system;
        an in storage lock table configured to store locking information for each record in the data set; and
        a shared buffer pool configured to temporarily store any records which are currently being accessed;
    creating a representation of the data set in the designated server address space;
    processing read and/or write requests for the data set using the representation of the data set in the designated server address space by processing read and/or write requests for the data set from the first local user and one or more second local users sequentially in order of receipt thereof regardless of which local user issued the read and/or write request when it is indicated that sharing of the data set is allowed;
    updating the data set in the file system with any changes made to the representation of the data set in the designated server address space; and
    relinquishing the lock on the data set after completing the update.

17. The method as recited in claim 16, further comprising hashing a record key provided for the data set into the in storage lock table while the data set is opened.

18. The method as recited in claim 16, further comprising creating and hosting one or more second ACBs configured to provide one or more second users access the representation of the data set.

* * * * *